US007168759B2

(12) United States Patent
Gallegos Geier (10) Patent No.: US 7,168,759 B2
(45) Date of Patent: Jan. 30, 2007

(54) FOLDING SUNSHADE FOR CAR SEAT (76) Inventor: Felicia L. Gallegos Geier, 20320 Twisted Pines, Colorado Springs, CO (US) 80908

( * ) Notice: Subject to any disclaimer, the term of this patent is extended or adjusted under 35 U.S.C. 154(b) by 0 days.

(21) Appl. No.: 10/246,590

(22) Filed: Sep. 18, 2002

(65) Prior Publication Data
US 2004/0051351 A1  Mar. 18, 2004

(51) Int. Cl.
A47C 7/62 (2006.01)
A45B 19/00 (2006.01)
E04F 10/00 (2006.01)

(52) U.S. Cl. ............ 297/184.1; 135/19.5; 160/20
(58) Field of Classification Search ......... 297/184.13, 297/184.1, 440.12; 135/19.5, 89, 90; 160/19, 160/20, 22, 57, 58.1, 370.2
See application file for complete search history.

(56) References Cited

U.S. PATENT DOCUMENTS

| 2,690,149 | A | * | 9/1954 | Throssel | 112/281 |
| 4,293,162 | A | * | 10/1981 | Pap et al. | 297/184.15 |
| 4,579,385 | A | * | 4/1986 | Koenig | 297/184.12 |
| 4,583,779 | A | | 4/1986 | Myers | |
| 4,733,906 | A | * | 3/1988 | Davis et al. | 297/184.13 |
| 4,784,433 | A | | 11/1988 | Purnell-Ayres | |
| 4,823,822 | A | * | 4/1989 | Maya | 135/87 |
| 4,923,249 | A | | 5/1990 | Mattox | |
| 5,067,770 | A | | 11/1991 | Hassell | |
| 5,096,257 | A | | 3/1992 | Clark | |
| 5,205,308 | A | | 4/1993 | Kendall | |
| 5,277,213 | A | * | 1/1994 | Mitchell | 135/88.02 |
| 5,538,319 | A | | 7/1996 | DiMurro | |
| 5,542,732 | A | * | 8/1996 | Pollman | 296/77.1 |
| 5,553,914 | A | | 9/1996 | Holladay | |
| D375,423 | S | | 11/1996 | Lapointe | |
| 5,975,558 | A | * | 11/1999 | Sittu | 280/647 |

FOREIGN PATENT DOCUMENTS

GB    2237190 A  *  5/1991

* cited by examiner

Primary Examiner—Peter M. Cuomo
Assistant Examiner—Sarah B. McPartlin
(74) Attorney, Agent, or Firm—Merchant & Gould P.C.

(57) ABSTRACT

A sunshade for an infant car seat or similar which is held in position by inserting a rear panel between the car seat and the vehicle seat on which it rests. A top panel, flexibly connected to the rear panel extends forward over the car seat to provide shade. Side panels extend downward from the sides of the top panel to provide increased protection. An optional front flap extends downward from the front edge of the top panel at an adjustable angle to further increase the level of protection. The side panels may be individually folded up and over the top panel to a stored position when not needed. The top and side panels can be folded upward and rearward as a unit to improve access to the car seat. Optional lengthwise creases in the side panels allow them to be folded into a more compact size to decrease the clearance necessary around the car seat in order to move the side panels between their stored and deployed positions. An optional lateral crease across the top and side panels serves a similar function when folding the top back for access. The side and rear panels may be folded upward into positions substantially parallel to the top panel and releasably secured there to form a substantially flat package for storage of the sunshade.

5 Claims, 7 Drawing Sheets

FOLDING SUNSHADE FOR CAR SEAT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the field of sunshades and specifically to sunshades intended for use with an infant car seat. Even more specifically it relates to such sunshades which fold for storage and to adjust their coverage.

2. Background Information

The need to provide shade for infants while they are in strollers and car seats has long been known. This need has been reinforced by recent realization that even a single sunburn during infancy can have serious long term consequences in terms of increased skin cancer risk.

The task of providing a sunshade for an infant car seat is complicated by the need for the sunshade to fit within the confines of the car. This usually means that the sunshade must fit closely around the car seat. This may result in a sunshade which is confining to the infant and interferes with the task of placing the infant in and removing the infant from the car seat.

Further complicating this issue is the reality of how much a consumer is willing to pay. With the rapid growth rate of infants, a car seat may be in use for only one year or less. Combined with a perception that the sunshade may only be needed during the summer months, this results in the consumer needing a sunshade for only a few months. This significantly restricts the amount they are willing to pay.

Several attempts have been made to develop an inexpensive sunshade for car seats, many using folded cardboard or other sheet material. While functional and inexpensive, these designs often suffer from problems with structural integrity, ease of access, or visibility. One example is disclosed in U.S. Pat. No. 4,784,433 to Purnell-Ayres. This is a simple folding sunshade with rear, top and side panels made of rubber. A significant lack in this sunshade is that there is no attachment between the side panels and the rear panel. The side panels are thus free to swing sideways and the top and sides are free to lift upward, especially in response to wind. This poses a risk to the infant since the sunshade could easily strike the infant in response to a gust of wind from an open window. Another design is disclosed in U.S. Pat. No. 4,923,249 to Mattox. Here the sunshade has only side and top panels and is secured by inserting the panels between the cushions of the car seat. This appears to be reasonably secure, but offers no alternatives for increasing visibility, or reducing confinement, by opening or removing the side panel on the side where the sun is not shining. Further, the sunshade must be completely removed to place or remove the infant. A third design is disclosed in U.S. Pat. No. 5,067,770 to Hassel. This is a sunshade which appears to be quite strong, but offers limited protection from the sides and has no allowance for adjustability and can only be moved out of the way by removing it from the car seat.

Many other designs exist but all seem to suffer from one or more of the following problems: poor structural integrity or a physical hazard to the infant; interference with placing the infant in the car seat; and lack of adjustability so that it provides protection from the direction of the sun while providing visibility in other directions. This last problem can be significant. Not only does increased visibility improve the experience for the infant, but also improves the ability of the caregiver to monitor the infant.

There is need for a sunshade which can be used with a wide variety of infant car seats, is inexpensive to manufacture, and solves the above problems. Specifically, it should move out of the way to provide access to the car seat and infant, adjust to provide protection where needed and visibility elsewhere, and be structurally sound in all configurations, with no loose elements which can strike the infant if windblown.

BRIEF SUMMARY OF THE INVENTION

The present invention is directed to a folding sunshade constructed of corrugated plastic or similar sheet material. By releasably interconnecting the various panels, it supports multiple configurations and can be folded out of the way.

According to the invention there is provided a rear panel which is inserted behind the car seat to hold the sunshade in position and a top panel which extends forward over the car seat. Integral braces support the top panel. Independent side panels extend downward from the sides of the top panel to provide increased protection. An optional front flap extends from the front edge of the top panel and can be bent downward for increased protection.

According to an aspect of the invention one or both side panels can be folded up and secured to the upper surface of the top panel when they are unneeded for sun protection. When folded down, they are secured to the rear panel to hold them in position and to further support the top panel.

According to another aspect of the invention the side panels may be creased parallel to their connection to the top panel so that they may be folded in order to decrease their size when folding them up over the top. This decreases the amount of side and top clearance required around the car seat.

Further in accordance with the invention the top and side panel may be folded up and back, away from the car seat to provide complete access to the infant. When the user is done, the top and sides are easily folded back into position with minimal effort. If desired, the top, and optionally side, panels may be creased laterally to provide clearance when folding them rearward in a similar manner to that used for the side panels.

Still further in accordance with the invention, the side and rear panels may all be folded against the top panel and secured in position, forming a relatively flat package which is easily stored.

The advantages of such an apparatus are a sunshade which can be inexpensively manufactured as a single die cut sheet, is adaptable to a wide variety of car seats, can be configured in various combinations of protection and visibility, and easily moves out of the way to provide access to the infant and the car seat.

The above and other features and advantages of the present invention will become more clear from the detailed description of a specific illustrative embodiment thereof, presented below in conjunction with the accompanying drawings.

DETAILED DESCRIPTION OF THE INVENTION

The following discussion focuses on the preferred embodiment of the invention, a folding sun shade for use with an infant car seat. However, as will be recognized by those skilled in the art, the disclosed method and apparatus are applicable to a variety of situations in which a removable shade for a seat or chair is desired.

Glossary

The following is a brief glossary of terms used herein. The supplied definitions are applicable throughout this specification and the claims unless the term is clearly used in another manner.

Car Seat—generally an infant seat of the type designed to be placed in the seat of a vehicle and retained in position by the use of the vehicles seat belts or other retaining mechanism. This term is intended to be broadly construed to include all similar seating devices whether or not for infants or for use in vehicles.

Slot—generally a narrow, elongated opening cut through a panel, intended to received a tab.

Tab—generally an extension of a panel intended to be inserted into a slot for the purpose of retaining one or more panels in position.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

Figure 1:
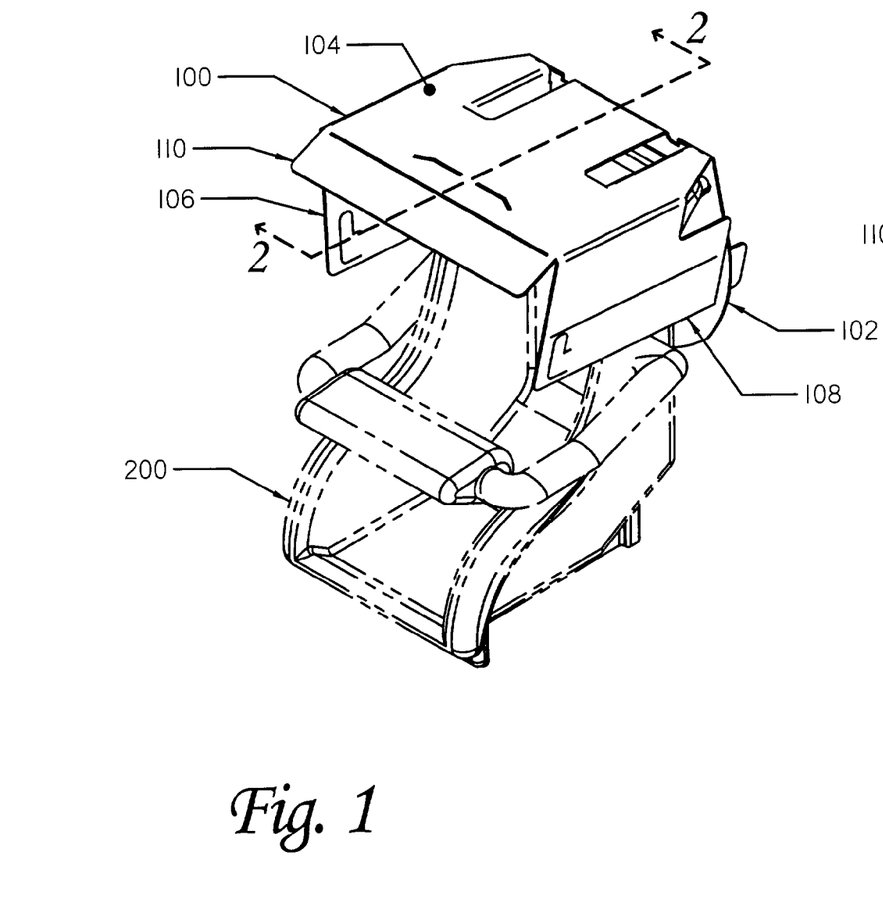
FIG. 1 is a perspective view of the inventive sunshade installed on a typical car seat.
Figure 2:
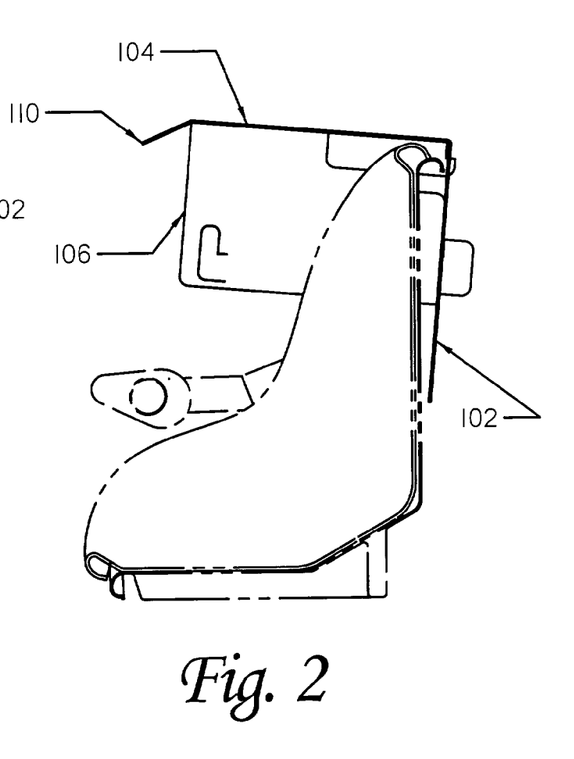
FIG. 2 is a cross section through the inventive sunshade installed on a typical car seat.

As can be seen in FIGS. 1 and 2, the present invention is a sunshade, 100, adapted for use with an infant car seat, 200, or similar seat. The sunshade is positioned with the back panel, 102, extending downward behind the car seat, sandwiched between the car seat and the vehicle seat upon which the car seat has been placed. The clamping force provided by this arrangement is sufficient to hold the inventive sunshade in position. The top panel, 104, extends forward over the car seat, and its occupant, to provide the majority of the shade. Side panels, 106 and 108, extend downward from the sides of the top panel to provide increased coverage when desired. Front flap, 110, angles downward from the front edge of the top panel to provide increased coverage from the front.

Figure 10:
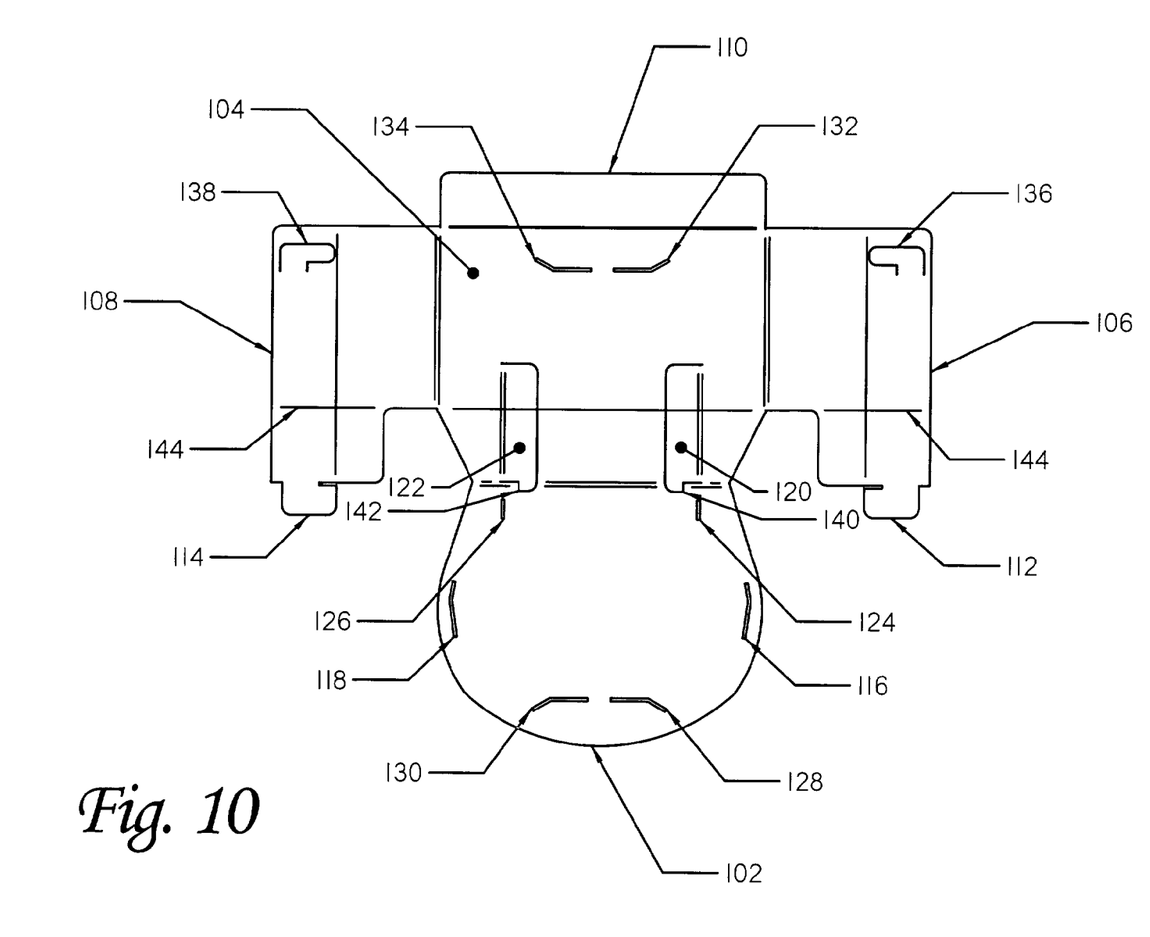
FIG. 10 illustrates the sunshade flattened as it might be cut during manufacturing.

As will be discussed below, the design of the sunshade offers significant flexibility in terms of configuration and adaptability. Further, dual functionality, as offered by the side panels also serving as supports, provides increased strength without the need for additional components. Referring to FIG. 10 it can be seen that the design of the sunshade also offers simple, one-piece design which can be inexpensively manufactured.

Throughout the following discussion and in the accompanying figures, the tabs and slots used to provide the various connections are shown in the orientations used in the preferred embodiment. Clearly, the direction and orientation of these tabs and slots can be reversed or otherwise re-oriented unless explicitly stated otherwise. Generally, creases are used to provide a hinged connection between the various panels. If preferred, fabric connections or hinges could be used to provide the same flexible connection.

It should be noted that several of the slots, such as 134, 118, and 130 are formed with two distinct segments oriented at a slight angle relative to each other. This is done so that when the corresponding tabs, which are straight, are inserted through the slot, they will be bent and then spring back to straight on the far side of the panel. A relief cut in the base of the tabs allows side of the tab to overlap the panel, preventing the tab from being retracted without again bending the tab. This serves to retain the tab in position as it cannot be withdrawn by merely pulling on the part it is retaining.

Structure

Referring to FIGS. 3–6, the sunshade can be seen in its default configuration, with both side panels lowered. The individual elements may be more clearly understood by also referencing FIG. 10.

Top panel, 104, extends outward from the back panel, 102, in a position which is generally horizontal above the car seat. In the preferred embodiment the angle between the top panel and the back panel is substantially perpendicular, but this angle is not critical. Other angles could clearly be used and may be desirable to adapt the sun shade to different car seats. The angle could even be made adjustable if desired. The angle of the top panel to the car seat is dependent on several factors, including the angle of the rear of the car seat where it contacts the back panel.

Figures 3, 3A:
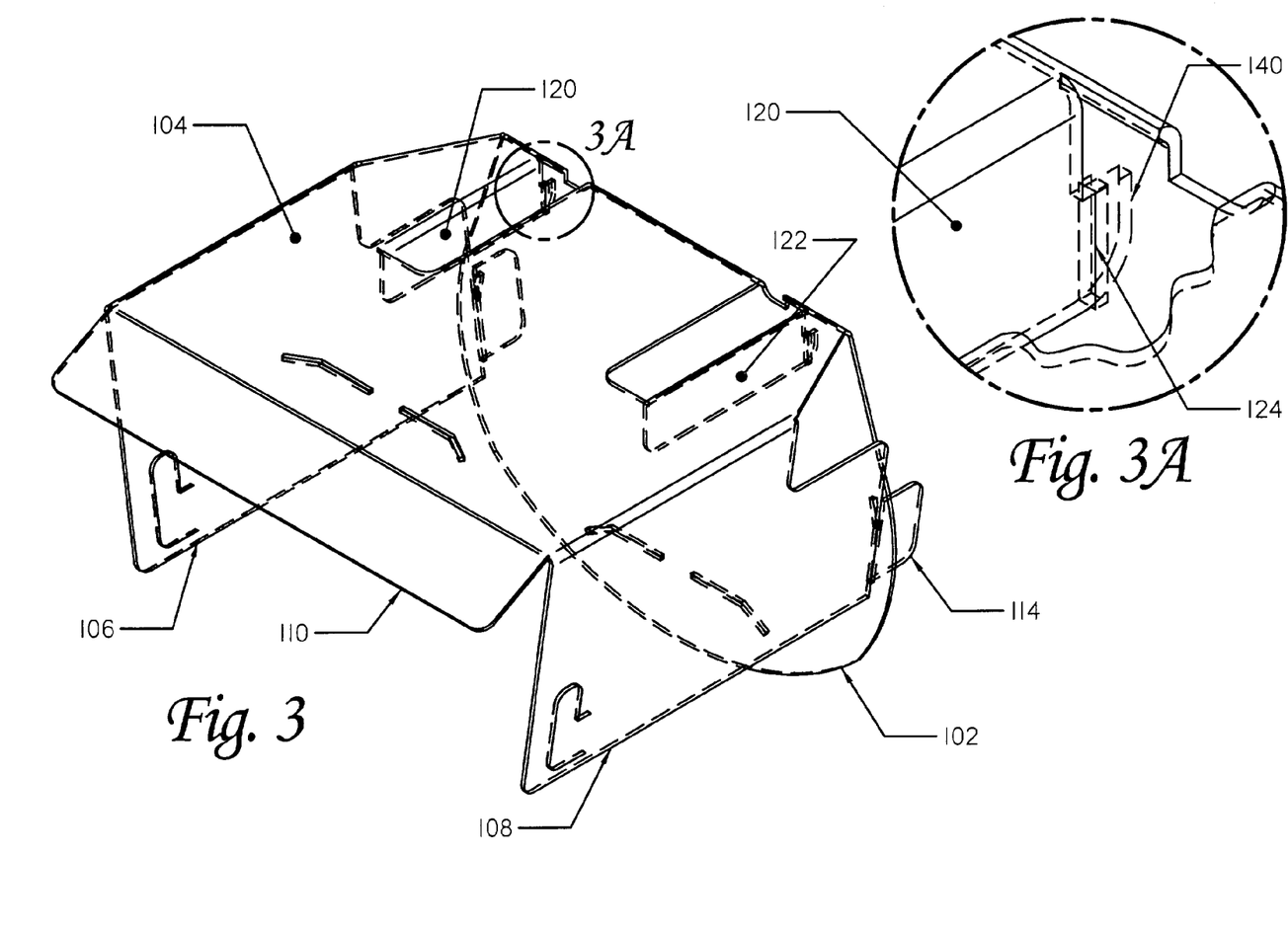
FIG. 3 is a perspective view of the sunshade.
FIG. 3A is a detailed view of a portion of FIG. 3 with a section of the top panel cut away to show the interaction of the tab at the rear of the brace with the slot in the rear panel.
Figure 4:
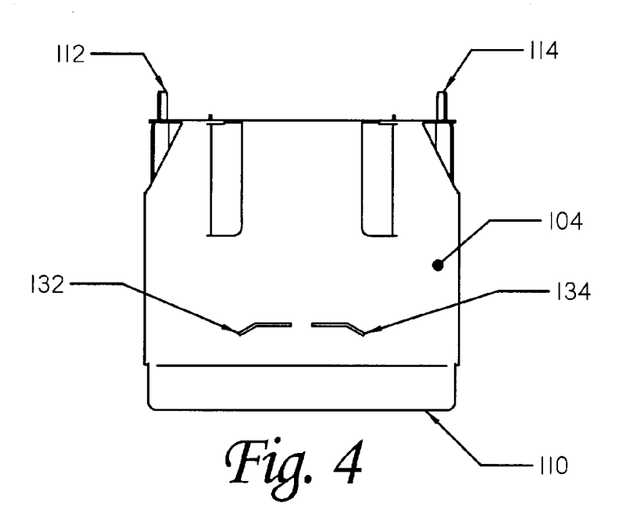
FIG. 4 is a top view of the sunshade.
Figure 5:
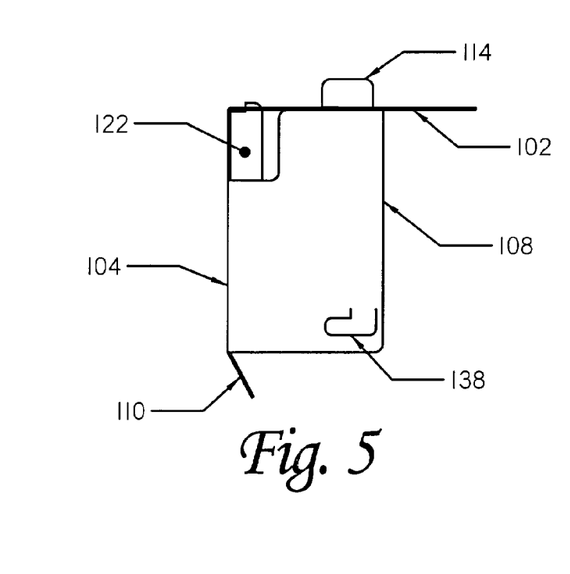
FIG. 5 is a side view of the sunshade.
Figure 6:
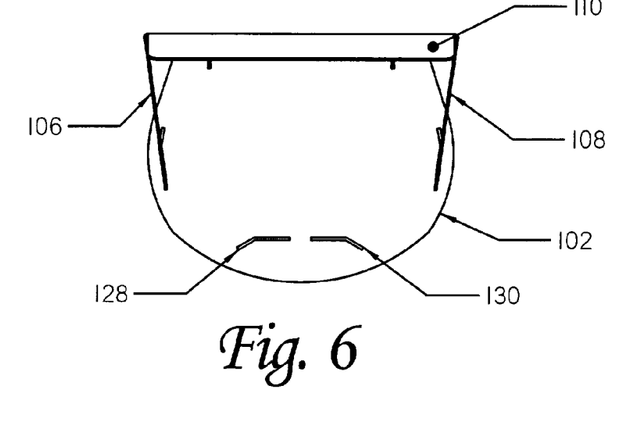
FIG. 6 is a front view of the sunshade.

The top panel is held in position by a redundant set of supports. The primary support is provide by braces, 120 and 122, which fold downward, substantially perpendicular to the top panel, 104, and bear against the back panel, 102. The detailed view FIG. 3A illustrates brace, 120, bearing against the back panel and tab, 140, engaging slot, 124, to retain the brace in position. Brace, 122, is retained in a similar manner by a tab engaging slot 126. The secondary support for the top panel is provided by the side panels, 106 and 108, when folded down. In their "down" position, the side panels also bear against the back panel and are retained by tabs 112 and 114 fitting into slots 116 and 118 respectively. While the side panels are much larger than the braces, and provide significantly more support for the top panel when in their down position, they will not always be in this position. Either or both of the side panels may be folded upward as discussed below. In this situation, the braces provide sufficient support for the top panel that the shape of the sunshade is retained with any configuration of the side panels.

Front flap, 110, extends forward from the top panel and in the preferred embodiment is formed by creasing an extension of the top panel. This provides a certain amount of angular adjustment for the front flap at a minimal cost. If preferred some other mechanism, such as a metal, plastic, or fabric hinge could be used and a means for holding the flap at a particular angle could be provided.

Figures 7, 7A:
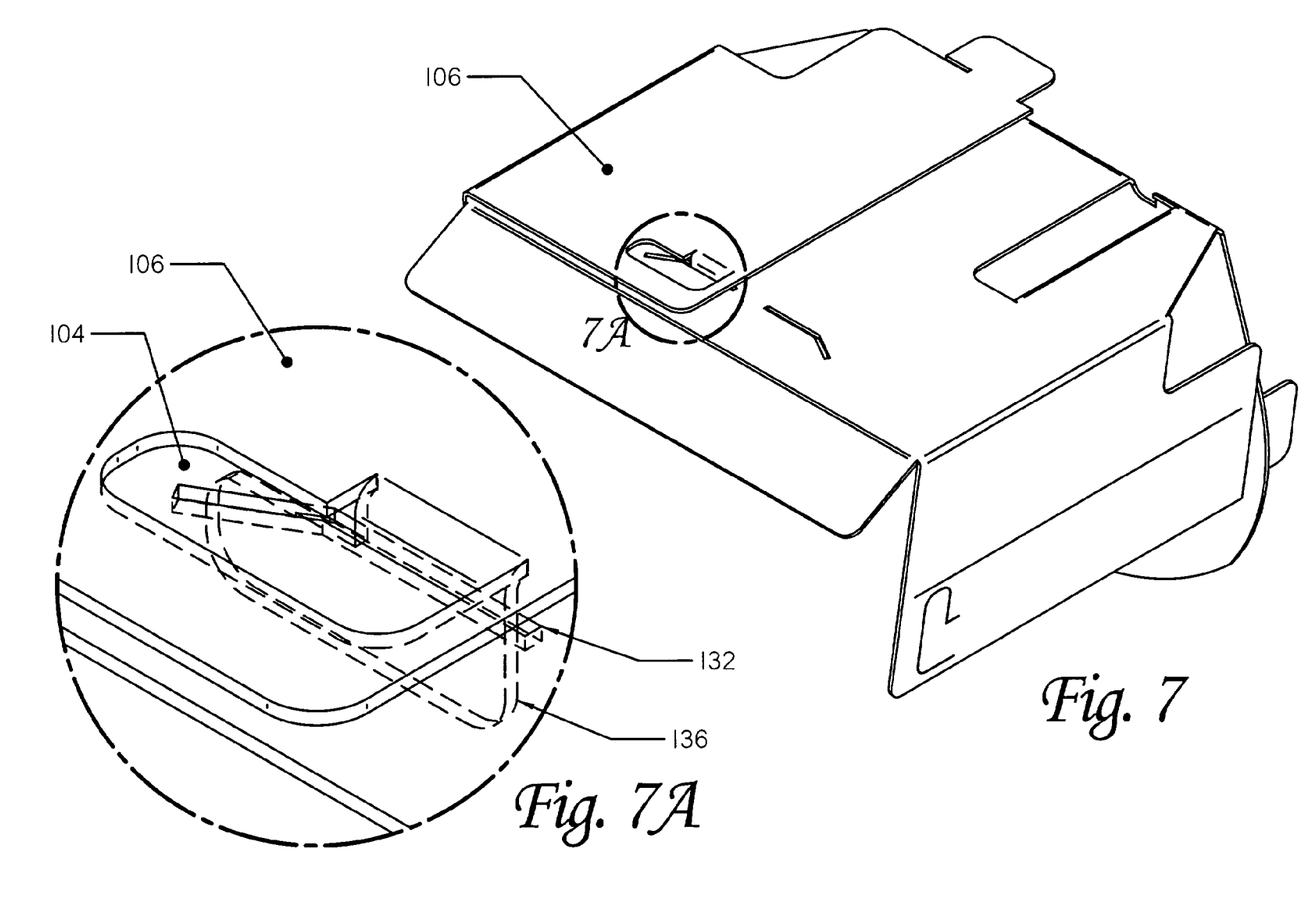
FIG. 7 is a perspective view of the sunshade with one side panel folded up over the top.
FIG. 7A is a detailed view of a portion of FIG. 7 with hidden edges illustrated to better show the interrelationship of the elements.

As illustrated in FIGS. 7 and 7A, either side panel can be folded up to provide increased visibility while still maximizing protection on the other side. This is especially beneficial where the sun may be shining through the side window of the car. The flap on that side can be left down for protection while the flap on the interior side is raised. As shown, the flap is secured in its raised position by inserting tab, 136, into slot, 132, in the top panel, 104. The other side panel would be secured in a similar manner using tab, 138, and slot, 134.

Figure 8:
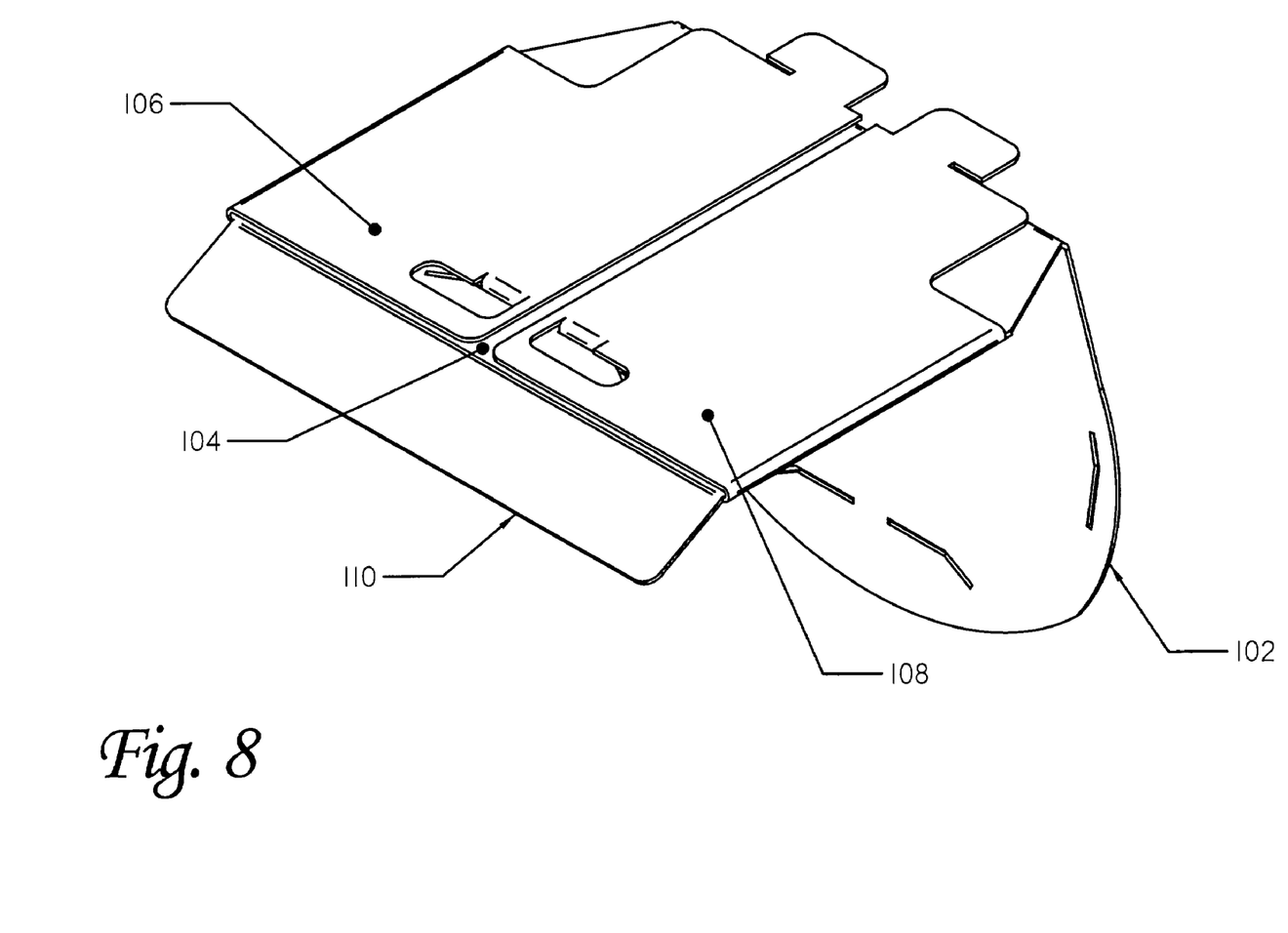
FIG. 8 is a perspective view of the sunshade with both side panels folded up.

The user also has the option of folding up both side panels as illustrated in FIG. 8. This provides for maximum visibility for the infant and of the infant by the caregiver. As discussed above, the top flap is supported by the braces, 120 and 122, as shown in FIG. 3.

Figure 9:
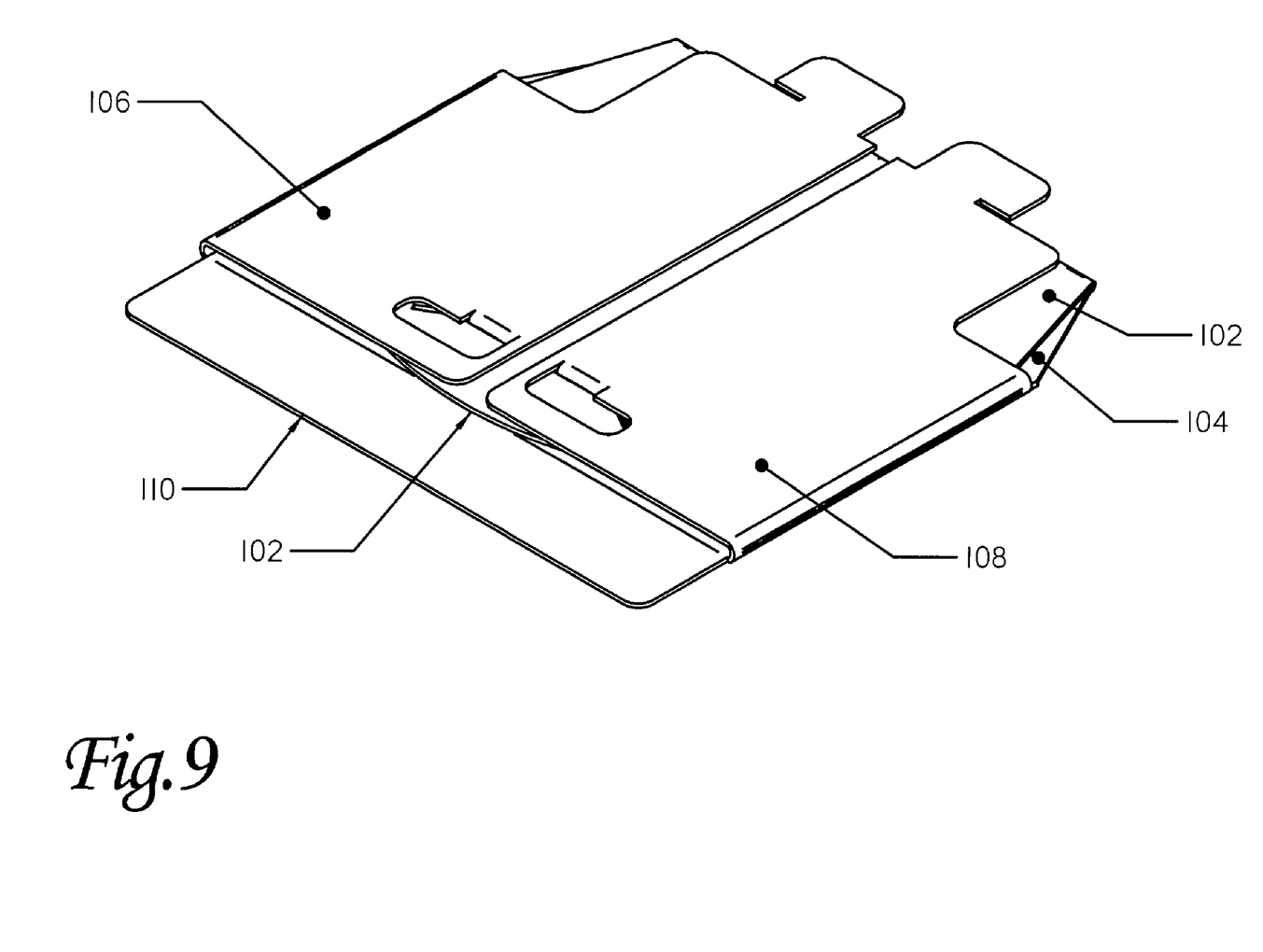
FIG. 9 is a perspective view of the sunshade with both side panels and the rear panel folded up over the top panel for storage.

The design of the inventive sunshade also allows it to be folded into a compact package for storage, sale, or shipping. Referring to FIG. 9 the stored configuration can be seen. Rear panel, 102, has been folded up over the top panel, 104, and then the side panels, 106 and 108, have in turn been folded up and over the rear panel. Tab, 136, passes through slot, 128, in the rear panel and slot, 132, in the top panel. Likewise, tab, 138, passes through slot, 130, in the rear panel and slot, 134, in the top panel. This secures the panels in their stored position, maintaining a relatively flat package. If desired, the sunshade could be adapted to allow the front flap, 110, to also be folded under the side panels for storage. Alternatively, the rear panel could be folded against the lower surface of the top panel, opposite of the side panels, and secured by inserting the side panel tabs through the top panel and then the rear panel.

Operation

To use the sunshade, rear panel, 102, is inserted behind the back of car seat, between it and the vehicle seat on which it is resting. Top panel, 104, is folded forward, over the car seat. Braces, 120 and 122, are folded downward and secured by inserting tabs, 140 and 142, into slots, 124 and 126, respectively.

The user may then configure the sunshade for the level of protection and visibility desired by positioning the side panels. If folded down, tabs, 112 and 114, will be inserted in to slots, 116 and 118 respectively. If folded up, they will be secured by inserting tabs, 136 and 138, into slots 132 and 134 respectively. Front flap, 110, may also be adjusted by changing its angle.

It should be noted that securing the side panels in their down position by the use of tabs and slots as discussed above serves a dual purpose. First, it strengthens the sunshade by further bracing the top panel. The tabs allow the side panels to resist upward as well as downward movement of the top panel. Second, it holds the side panels in position. If unsecured, wind from an open car window could cause the side panels to flap, perhaps violently, possibly striking the infant in the car seat. With the tabs in place, this risk is avoided.

To simplify the task of placing the infant in the car seat or removing it from the car seat, the sunshade may be folded out of the way without removing it, tabs, 112 and 114, are released from their slots, if necessary, and the top panel folded backward, clear of the car seat. In the preferred embodiment, tabs, 140 and 142, in the braces do not lock into their tabs, allowing the top panel to be lifted, or folded back, without the need to release these tabs. Clearly these tabs could be made locking if desired. An optional lateral crease, 144 in FIG. 10, allows the top and side panels to bend while the sunshade is being folded back to provided increased clearance to the ceiling of the vehicle.

While tabs and slots have been used in the preferred embodiment to interconnect the panels, other methods could clearly be used. An obvious choice is hook and loop fastener affixed to the panels in mating locations. This offers advantages in simplicity but is more expensive and doesn't readily allow for multiple panels to be joined with a single connector. The hook and loop fastener can also be used in combination with the tabs and slots to provide more secure attachment than either alone. This may be done by using the hook and loop fastener to hold the same panel as the tabs, in a redundant approach, or by using the hook and loop fastener to hold the tabs in position within the slot such as by attaching the tab to the surface on the far side of the panel through which it extends when mated with the slot.

Materials

A variety of sheet materials are applicable for use in the present invention. Corrugated paperboard is functional but has been found to fatigue rapidly. Corrugated plastic has been found to perform well, offering light weight, good rigidity, and increased resistance to fatigue and tearing at the creases as exhibited by paper based materials.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A sunshade for use with car seat, said sunshade comprising:
    (a) a rear panel adapted to be inserted behind the car seat;
    (b) a top panel having a flexible connection to said rear panel and adapted to extend forward over the car seat;
    (c) opposing side panels flexibly connected to said top panel and adapted to extend downward; and
    (d) at least one brace, bearing upon said rear panel and supporting said top panel; wherein said side panels are individually movable from a downward deployed position to an upward stored position, said side panels releasably attached to said rear panel when in said deployed position, said side panels bear against said rear panel when in said deployed position thereby further supporting said top panel and said brace and said side panels are releasable from said rear panel and said top panel, side panels and brace are foldable upward and rearward as a unit.

2. The sunshade of claim 1 wherein said top panel and said side panels are fbldable along a single, common joint substantially parallel to said connection of said top panel to said rear panel whereby they may be folded into a more compact configuration during said upward and rearward movement.

3. A sunshade for use with car seat, said sunshade comprising:
   (a) a rear panel adapted to be inserted behind the car seat;
   (b) a top panel having a flexible connection to said rear panel and adapted to extend forward over the car seat;
   (c) opposing side panels flexibly connected to said top panel, individually movable from a downward deployed position to an upward stored position substantially parallel to said top panel; and
   (d) plural braces, flexibly connected to said top panel and bearing upon and releasably attachable to said rear panel, wherein said side panels bear against and releasably attach to said rear panel when in said deployed position, and wherein said braces and said side panels are relcasable from said rear panel and said top panel, side panels and brace are foldable upward and rearward as a unit.

4. The sunshade of claim 3 wherein said top panel and said side panels are foldable along a single, common joint substandally parallel to said connection of said top panel to said rear panel whereby they may be folded into a more compact configuration during said upward and rearward movement.

5. A sunshade for use with car seat, said sunshade comprising:
   (a) a rear panel adapted to be inserted behind the car seat;
   (b) a top panel having a flexible connection to said rear panel and adapted to extend forward over the car seat;
   (c) opposing side panels flexibly connected to said top panel, individually movable from a downward deployed position to an upward stored position substantially parallel to said top panel; and
   (d) plural braces, flexibly connected to said top panel and bearing upon and releasably attachable to said rear panel,
   wherein said rear panel is movable to a stored position substantially parallel to said top panel and is secured in said stored position by said side panels in their said stored position and further cormprising a single means for releasably attaching each of said side panels to said top panel when said side panels are in said stored position and wherein each of said means for releasably attaching also releasably attaches said rear panel to said top panel when said rear panel is in said stored position.

* * * * *